(12) United States Patent
Jeoung

(10) Patent No.: US 11,289,733 B2
(45) Date of Patent: Mar. 29, 2022

(54) RECHARGEABLE LITHIUM BATTERY

(71) Applicant: Samsung SDI Co., Ltd., Yongin-si (KR)

(72) Inventor: Jin-Man Jeoung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/285,289

(22) Filed: Oct. 4, 2016

(65) Prior Publication Data

US 2017/0117576 A1 Apr. 27, 2017

(30) Foreign Application Priority Data

Oct. 26, 2015 (KR) .................... 10-2015-0148754

(51) Int. Cl.
*H01M 10/0525* (2010.01)
*H01M 4/583* (2010.01)
(Continued)

(52) U.S. Cl.
CPC ....... *H01M 10/0525* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS

| 5,380,605 A * | 1/1995 | Brochu ...................... C08J 3/09 |
| | | 429/188 |
| 6,869,724 B2 * | 3/2005 | Suzuki .................. H01M 4/621 |
| | | 429/94 |

(Continued)

FOREIGN PATENT DOCUMENTS

| CN | 100359745 C | 1/2008 |
| CN | 103811716 A | 5/2014 |

(Continued)

OTHER PUBLICATIONS

Merriam-Webster Online Dictionary entry for "aprotic" known as of 1931 (copy provided) (Year: 1931).*

(Continued)

*Primary Examiner* — Amanda J Barrow
(74) *Attorney, Agent, or Firm* — Lewis Roca Rothgerber Christie LLP

(57) ABSTRACT

A rechargeable lithium battery includes a positive electrode including a positive current collector and a positive active mass layer on the positive current collector, the positive active mass layer including a positive active material; a negative electrode including a negative current collector and a negative active mass layer on the negative current collector, the negative active mass layer including a negative active material; and an electrolyte, wherein Equation 1 is satisfied:

$0.3 \leq A/B \leq 2.5$  Equation 1 wherein, in Equation 1,
A satisfies Equation 2, and
B satisfies Equation 3:

$0.01 \leq$ active mass density (g/cc) of the positive active mass layer/thickness (μm) of the positive electrode $\leq 0.1$  Equation 2

$0.01 \leq$ active mass density (g/cc) of the negative active mass layer/thickness (μm) of the negative electrode $\leq 0.05$  Equation 3.

8 Claims, 1 Drawing Sheet

(51) Int. Cl.
| | |
|---|---|
| H01M 10/52 | (2006.01) |
| H01M 4/525 | (2010.01) |
| H01M 4/133 | (2010.01) |
| H01M 4/505 | (2010.01) |
| H01M 4/131 | (2010.01) |
| H01M 4/40 | (2006.01) |
| H01M 4/02 | (2006.01) |
| H01M 4/04 | (2006.01) |

(52) U.S. Cl.
CPC ............ *H01M 4/40* (2013.01); *H01M 4/505* (2013.01); *H01M 4/525* (2013.01); *H01M 4/583* (2013.01); *H01M 10/52* (2013.01); *H01M 4/0435* (2013.01); *H01M 2004/021* (2013.01); *H01M 2220/20* (2013.01)

(56) References Cited

U.S. PATENT DOCUMENTS

| | | | | |
|---|---|---|---|---|
| 6,967,066 | B2 | 11/2005 | Kameyama et al. | |
| 7,344,802 | B2* | 3/2008 | Fujimoto | H01M 4/505 429/217 |
| 2002/0031703 | A1* | 3/2002 | Kameyama | H01M 2/0212 429/162 |
| 2009/0011333 | A1* | 1/2009 | Wakita | H01M 4/587 429/220 |
| 2010/0216017 | A1* | 8/2010 | Saito | H01M 4/587 429/199 |
| 2011/0206988 | A1* | 8/2011 | Tanaka | H01M 10/0525 429/220 |
| 2012/0270101 | A1 | 10/2012 | Higashizaki et al. | |
| 2013/0288107 | A1* | 10/2013 | Kim | H01M 4/505 429/158 |
| 2014/0120410 | A1* | 5/2014 | Jeoung | H01M 4/36 429/163 |
| 2014/0234682 | A1* | 8/2014 | Kwon | H01M 10/0587 429/94 |
| 2014/0370337 | A1* | 12/2014 | Matsui | H01M 10/052 429/61 |
| 2016/0285111 | A1* | 9/2016 | Norton | H01M 50/267 |
| 2016/0322669 | A1* | 11/2016 | Sawa | H01M 10/0525 |

FOREIGN PATENT DOCUMENTS

| | | |
|---|---|---|
| EP | 2728651 A1 | 5/2014 |
| JP | 2007-165074 A | 6/2007 |
| JP | 2008-112594 A | 5/2008 |
| JP | 2009-123465 A | 6/2009 |
| JP | 2010-267878 A | 11/2010 |
| JP | 2011-175933 A | 9/2011 |
| KR | 10-2012-0080227 A | 7/2012 |
| KR | 10-2014-0055979 A | 5/2014 |
| KR | 10-1464524 B1 | 11/2014 |

OTHER PUBLICATIONS

Dictionary.com entry for "aprotic" (Date unknown) (Year: 2020).*
Steven J. Hultquist, "The Introduction of Negative Claim Limitations during Ex Parte Prosecution: 35 U.S.C. 112 and the Issue of Antecedent Support," Journal of the Patent and Trademark Society, Issue 3, Mar. 1991, pp. 218-234 (Year: 1991).*
Crabtree et al., "The energy-storage frontier: Lithium-ion batteries and beyond," MRS Bulletin, vol. 40, Dec. 2015 (Year: 2015).*
EPO Office Action dated Jan. 26, 2018, for corresponding European Patent Application No. 16195630.5 (5 pages).
EPO Extended Search Report dated Dec. 19, 2016, for corresponding European Patent Application No. 16195630.5 (8 pages).
EPO Office Action dated Jun. 26, 2018, for corresponding European Patent Application No. 16195630.5 (5 pages).
European Office Action for corresponding European Application No. 16 195 630.5, dated Feb. 27, 2019, 6 pages.
Wood III, David L.; et al.; Prospects for reducing the processing cost of lithium batteries, Journal of Power Sources, Elsevier SA, CH, http://dx.doi.org/10.1016/j.jpowsour.2014.11.019, vol. 275, Nov. 6, 2014, pp. 234-242.
Xue, Nansi, et al.; Optimization of a Single Lithium-Ion Battery Cell with a Gradient-Based Algorithm, Journal of the Electrochemical Society, http://jes.ecsdl.org/content/160/8/41017.full.pdf. May 7, 2013, pp. 1071-1078.
European Patent Office Action for corresponding European Patent Application No. 16 195 630.5, dated Aug. 9, 2019, 3 pages.
Chinese Office Action, with English translation, dated Sep. 10, 2020, issued in corresponding Chinese Patent Application No. 201610959407.6 (16 pages).
China National Intellectual Property Administration, Second Office Action issued in corresponding Chinese Application No. 201610959407.6 (with English translation), Mar. 19, 2021 and accompanying Search Report dated Mar. 12, 2021, 14 pages.

* cited by examiner

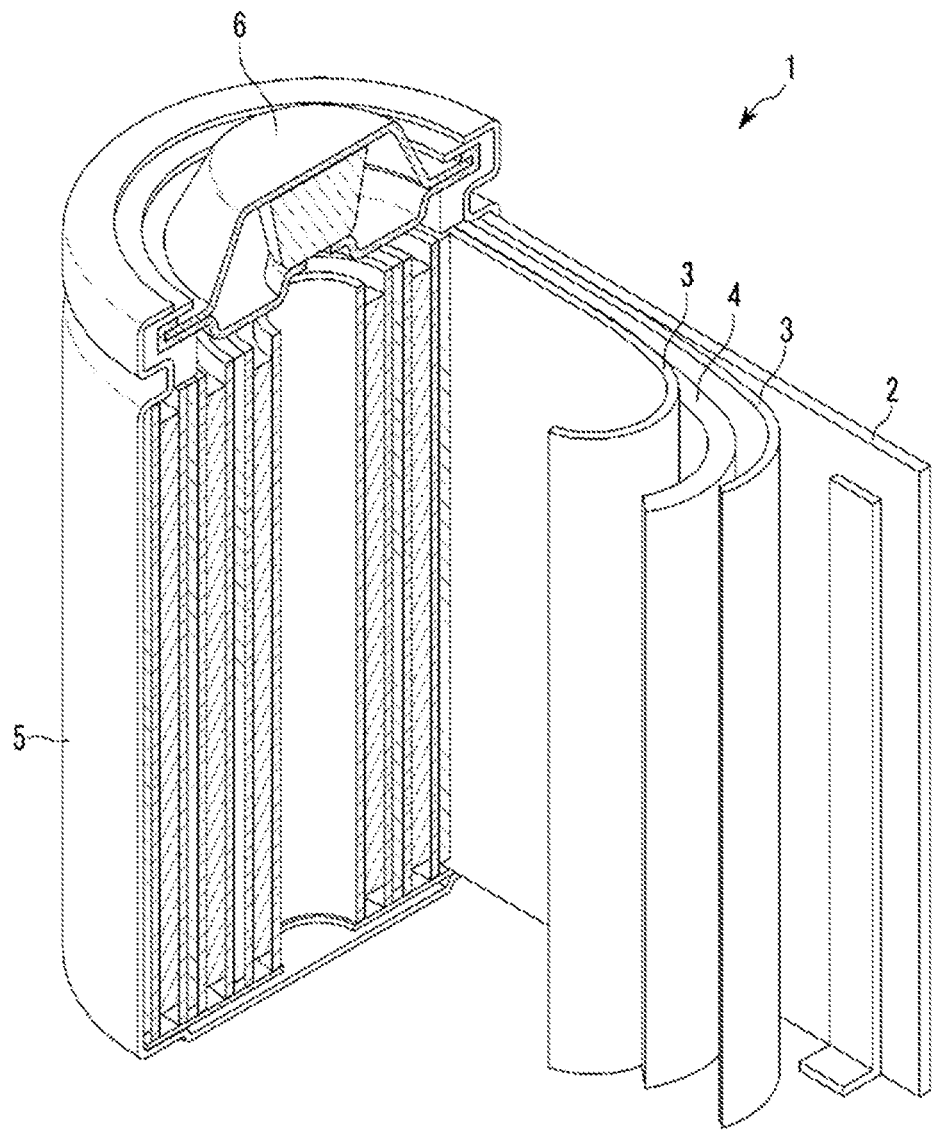

RECHARGEABLE LITHIUM BATTERY

CROSS-REFERENCE TO RELATED APPLICATION

This application claims priority to and the benefit of Korean Patent Application No. 10-2015-0148754 filed in the Korean Intellectual Property Office on Oct. 26, 2015, the entire contents of which are incorporated herein by reference.

BACKGROUND

1. Field

A rechargeable lithium battery is disclosed.

2. Description of the Related Art

In recent times, due to reductions in size and weight of portable electronic equipment, and popularization of portable electronic devices, researches on rechargeable lithium batteries having high energy density as power sources for portable electronic devices have been actively conducted. Rechargeable lithium batteries include a negative electrode, a positive electrode, and an electrolyte, and generate electrical energy by oxidation and reduction reactions when lithium ions are intercalated/deintercalated in the positive electrode and negative electrode.

Such rechargeable lithium batteries use a lithium metal, a carbon-based material, Si, and/or the like for a negative active material. For a positive active material of rechargeable lithium batteries, metal chalcogenide compounds being capable of intercalating and deintercalating lithium ions, and, for example, composite metal oxide such as $LiCoO_2$, $LiMn_2O_4$, $LiNiO_2$, $LiNi_{1-x}Co_xO_2$ (0<X<1), $LiMnO_2$, and/or the like has been used. Recently, research on realizing high power characteristics of the rechargeable lithium battery has been conducted in order to use the rechargeable lithium battery for a vehicle.

SUMMARY

One aspect of an embodiment is directed toward a rechargeable lithium battery having high rate capability and improved output characteristics.

One embodiment provides a rechargeable lithium battery that includes a positive electrode including a positive current collector and a positive active mass layer on the positive current collector, the positive active mass layer including a positive active material; a negative electrode including a negative current collector and a negative active mass layer on the negative current collector, the negative active mass layer including a negative active material; and an electrolyte, wherein Equation 1 is satisfied:

$$0.3 \leq A/B \leq 2.5 \quad \text{Equation 1}$$

wherein, in Equation 1,
A satisfies Equation 2, and
B satisfies Equation 3:

$$0.01 \leq \text{active mass density (g/cc) of the positive active mass layer/thickness (μm) of the positive electrode} \leq 0.1 \quad \text{Equation 2}$$

$$0.01 \leq \text{active mass density (g/cc) of the negative active mass layer/thickness (μm) of the negative electrode} \leq 0.05. \quad \text{Equation 3}$$

The positive active mass layer may be on both sides of the positive current collector. The negative active mass layer may be on both sides of the negative current collector.

The active mass density of the positive active mass layer may be about 0.5 g/cc to about 4.0 g/cc, and the thickness of the positive electrode may be about 30 μm to about 200 μm.

The active mass density of the negative active mass layer may be about 0.5 g/cc to about 2.5 g/cc, and the thickness of the negative electrode may be about 30 μm to about 200 μm.

The positive active mass layer may further include activated carbon.

The negative active material may include soft carbon.

Accordingly, the positive electrode according to one embodiment shows fast intercalation and deintercalation characteristics at a high rate and may provide a rechargeable lithium battery cell having excellent output characteristics.

BRIEF DESCRIPTION OF THE DRAWING

The accompanying drawing, together with the specification, illustrates an embodiment of the subject matter of the present disclosure, and, together with the description, serves to explain principles of embodiments of the subject matter of the present disclosure. The accompanying drawing is a schematic view showing the structure of a rechargeable lithium battery according to one embodiment.

DETAILED DESCRIPTION

Exemplary embodiments will hereinafter be described in more detail. However, these embodiments are exemplary, and this disclosure is not limited thereto. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

A rechargeable lithium battery according to one embodiment includes a positive electrode including a positive current collector; a positive active mass layer on (e.g., disposed on) the positive current collector and including a positive active material; a negative electrode including a negative current collector; a negative active mass layer on (e.g., disposed on) the negative current collector and including a negative active material; and an electrolyte, wherein Equation 1 is satisfied.

$$0.3 \leq A/B \leq 2.5 \quad \text{Equation 1}$$

wherein, in Equation 1,
A satisfies Equation 2, and
B satisfies Equation 3.

$$0.01 \leq \text{active mass density (g/cc) of positive active mass layer/thickness (μm) of positive electrode} \leq 0.1 \quad \text{Equation 2}$$

$$0.01 \leq \text{active mass density (g/cc) of negative active mass layer/thickness (μm) of negative electrode} \leq 0.05. \quad \text{Equation 3}$$

In an embodiment of a rechargeable lithium battery, in general, an active mass is a mixture including an active material and, selectively or optionally, a conductive material and a binder, and an active mass layer is formed of the active mass on a current collector.

When the ratio A/B satisfies the Equation condition (e.g., Equation 1), an embodiment of a rechargeable lithium battery having fast intercalation and deintercalation characteristics at a high rate and suitable or appropriate capacity may be provided.

According to one embodiment, the positive active mass layer may be formed on both sides of the positive current collector (e.g., on two sides of the positive current collector that face away from each other), and the negative active mass layer may be formed on both sides of the negative current collector (e.g., on two sides of the negative current collector that face away from each other).

In one embodiment, the positive electrode and the negative electrode may each have a thickness obtained by adding the thickness of the respective current collector and the thickness of the respective active mass layer, and herein, when the active mass layer is formed on both sides of the current collector, the positive electrode may have a thickness determined by the thickness of the positive current collector and the thicknesses of the positive active mass layers formed on both sides thereof (e.g., a thickness sum of two active mass layers). When the negative active mass layer is formed on both sides of the negative current collector, the negative electrode may have a thickness determined by the thickness of the negative current collector and the thicknesses of the negative active mass layers formed on both sides thereof (e.g., a thickness sum of the two negative active mass layers).

The active mass density of the positive active mass layer may be about 0.5 g/cc to about 4.0 g/cc, and a thickness of the positive electrode may be about 30 μm to about 200 μm. When the active mass density and the thickness satisfy Equation 2 about relationship between themselves, suitable or appropriate current density and excellent output and, for example, fast intercalation and deintercalation characteristics at a high rate may be obtained.

The active mass density of the negative active mass layer may be about 0.5 g/cc to about 2.5 g/cc, and a thickness of the negative electrode may be about 30 μm to about 200 μm. When the active mass density and the thickness satisfy the Equation 3 about relationship between themselves within the above ranges of the active mass and the thickness, excellent output as well as suitable or appropriate current density and, for example, fast intercalation and deintercalation characteristics at a high rate may be obtained.

In general, as an electrode has higher active mass density, capacity may be increased as well, but excessive active mass may not be suitable or appropriate. For example, when a loading level (the amount of an active material unit per area) is increased (e.g., excessively increased), output characteristics may be deteriorated. In addition, when an active mass layer is thinner, intercalation and deintercalation characteristics at a high rate may be improved, but when too thin (e.g., excessively thin), capacity may become much deteriorated. Accordingly, one embodiment is to obtain excellent capacity and fast intercalation and deintercalation characteristics at a high rate by suitably or appropriately adjusting active mass density and thickness of positive and negative electrodes to satisfy Equation 1.

Accordingly, a rechargeable lithium battery having the above structure according to one embodiment may be usefully used as an ISG (idling stop and go) among the battery for the vehicles to increase fuel efficiency of the vehicle (e.g., a car or automobile) and reduce $CO_2$ (e.g., reduce $CO_2$ emissions from the vehicle). In general, the battery for ISG may play a role of stopping an engine when a car stops and of restarting the engine when the car goes (e.g., resumes travel) and thus requires a very fast reaction speed to start the car very instantly (e.g., very quickly). In addition, this ISG battery may maintain a full-charge (or a substantially full-charge) during driving of the car and is also required of excellent output characteristic at a low temperature.

The positive active mass layer of the positive electrode may further include activated carbon along with the positive active material. When the activated carbon is further included, both features of a rechargeable lithium battery and features of a supercapacitor may be obtained, providing a battery having intercalation and deintercalation characteristics of a fast current and long cycle-life characteristics. In addition, since the active mass density of the positive active mass layer and the thickness of the positive electrode satisfy Equation 3, fast intercalation and deintercalation characteristics at a high rate and high-capacity may be obtained.

The positive active material may include lithiated intercalation compounds that reversibly intercalate and deintercalate lithium ions. For example, a composite oxide of at least one of cobalt, manganese, nickel, or a combination thereof, and lithium may be used. As used herein, the terms "combination thereof" and "combinations thereof" may refer to a chemical combination (e.g., an alloy or chemical compound), a mixture, or a laminated structure of components.

Examples may include compounds represented by the following formulae:

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $Li_aFePO_4$ (0.90≤a≤1.8)

In the above formulae, A is selected from Ni, Co, Mn, and a combination thereof; X is selected from Al, Ni, Co, Mn, Cr, Fe, Mg, Sr, V, a rare earth element and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V and combination thereof; Q is selected from Ti, Mo, Mn and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any suitable coating method available in the art such as spray coating, dipping, and/or the like, and therefore, further description thereof is not necessary here.

In the positive active mass layer, a positive active material and activated carbon may be included in a ratio of about 85 wt % to about 98 wt % based on the total weight of the positive active material layer. For example, in the positive active mass layer, the positive active material and activated carbon may be mixed in a weight ratio of 77:23 to 98:2 within the aforementioned range of about 85 wt % to about 98 wt %.

In addition, the binder and conductive material may be respectively included in an amount of about 1 wt % to about 10 wt % based on the total weight of the positive active mass layer.

The binder improves binding properties of positive active material particles with one another and with a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material provides an electrode with conductivity. Any suitable electrically conductive material may be used as a conductive material unless it causes an unsuitable chemical change in the battery. Examples of the conductive material include a carbon-based material such as natural graphite, artificial graphite, carbon black, acetylene black, ketjen black, carbon fiber and the like; a metal-based material such as metal powder or metal fiber including copper, nickel, aluminum, silver, and the like; a conductive polymer such as a polyphenylene derivative, or a mixture thereof.

The current collector may be Al but is not limited thereto.

The positive electrode may be manufactured by a method including mixing a positive active material, activated carbon, a conductive material and a binder in a solvent to prepare an active material composition, and coating the active material composition on a current collector to manufacture a positive active mass layer. The solvent includes N-methylpyrrolidone and the like, but is not limited thereto.

The negative electrode includes a current collector and a negative active mass layer (e.g., a negative active mass layer on the current collector), and the negative active mass layer includes a negative active material.

The negative active material includes a material that reversibly intercalates/deintercalates lithium ions, a lithium metal, a lithium metal alloy, a material being capable of doping/dedoping lithium, and/or a transition metal oxide.

The material that can reversibly intercalate/deintercalate lithium ions includes a carbon material. The carbon material may be any suitable carbon-based negative active material generally used in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and/or the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and/or the like. At least one of these materials may be mixed with $SiO_2$. The elements Q and R may be selected from Ni, Ti, Fe, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide includes vanadium oxide, lithium vanadium oxide, and/or the like.

When the negative active material is a carbon material such as amorphous carbon (e.g., soft carbon, hard carbon, and/or the like), a mixture of the amorphous carbon and crystalline carbon, or the like, fast intercalation and deintercalation characteristics at a high rate may be much increased (e.g., maximized).

In the negative active mass layer, the negative active material may be included in an amount of about 95 wt % to about 99 wt % based on the total weight of the negative active mass layer.

The negative active mass layer may include a binder, and, optionally, a conductive material. The negative active mass layer may include about 1 to about 5 wt % of a binder based on the total weight of the negative active mass layer. When the negative active mass layer includes a conductive material, the negative active mass layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material is included to provide electrode conductivity. Any suitable electrically conductive material may be used as a conductive material unless it causes an unsuitable chemical change in the battery. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The negative electrode may be manufactured by a method including mixing an active material, a conductive material, and a binder in a solvent to prepare an active material composition, and coating the active material composition on a current collector. The solvent includes N-methylpyrrolidone and the like, but is not limited thereto. When a water-soluble binder is used for manufacturing a negative electrode, a negative active material composition may be prepared using water as a solvent.

The electrolyte includes an organic solvent and a lithium salt.

The organic solvent serves as a medium of transmitting ions taking part in the electrochemical reaction of the battery and may be a non-aqueous organic solvent.

The organic solvent may include a carbonate-based, ester-based, ether-based, ketone-based, alcohol-based, and/or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon that may include a double bond, an aromatic ring, and/or an ether bond), amides such as dimethylformamide, dioxolanes such as 1,3-dioxolane, sulfolanes, and the like.

The organic solvent may be used singularly or in a mixture. When the organic solvent is used in a mixture, the mixture ratio may be controlled in accordance with a desirable or suitable battery performance.

The carbonate-based solvent may include a mixture including a cyclic carbonate and a linear carbonate. The cyclic carbonate and linear carbonate are mixed together to a volume ratio of about 1:1 to about 1:9. When the mixture is used as an electrolyte, it may have enhanced performance.

In addition, the organic solvent according to one embodiment may further include an aromatic hydrocarbon-based solvent as well as the carbonate-based solvent. The carbonate-based solvent and aromatic hydrocarbon-based solvent may be mixed together to a volume ratio of about 1:1 to about 30:1.

The aromatic hydrocarbon-based organic solvent may be an aromatic hydrocarbon-based compound represented by Chemical Formula 1.

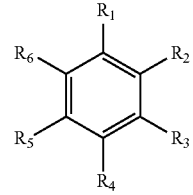

Chemical Formula 1

In Chemical Formula 1, $R_1$ to $R_6$ are independently a hydrogen atom, a halogen atom, a C1 to C10 alkyl, a C1 to C10 haloalkyl, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 to improve cycle life, as an additive for improving cycle life.

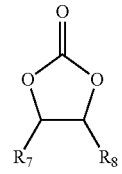

Chemical Formula 2

In Chemical Formula 2, $R_7$ and $R_8$ are the same or different and may be each independently a hydrogen atom, a halogen atom, a cyano group (CN), a nitro group ($NO_2$), or a C1 to C5 fluoroalkyl group, provided that at least one of $R_7$ and $R_8$ is a halogen atom, a cyano group (CN), a nitro group ($NO_2$), or a C1 to C5 fluoroalkyl group, and $R_7$ and $R_8$ are not simultaneously a hydrogen atom.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be flexibly used within a suitable or appropriate range.

The electrolyte may further include a borate-based compound as an additive in order to improve output characteristics. The borate-based compound may include tris(trimethylsilylborate, TMSB), but is not limited thereto. The amount of the borate-based compound may be flexibly used within a suitable or appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example, an integer of 1 to 20), LiCl, LiI and $LiB(C_2O_4)_2$ (lithium bis(oxalato) borate; LiBOB). The lithium salt may be used in a concentration of about 0.1 M to about 2.0 M. When the lithium salt is included at the above concentration range, an electrolyte may have excellent performance and lithium ion mobility due to optimal electrolyte conductivity and viscosity.

The separator may include polyethylene, polypropylene, polyvinylidene fluoride or multi-layers thereof such as a polyethylene/polypropylene double-layered separator, a polyethylene/polypropylene/polyethylene triple-layered separator, and/or a polypropylene/polyethylene/polypropylene triple-layered separator.

This rechargeable lithium battery includes a positive electrode, separator, a negative electrode, and an electrolyte housed inside a battery case.

Herein, the positive electrode, the separator, and the negative electrode may be wound into a jelly-roll shape, and this jelly-roll may have a volume (the volume of the positive electrode, the separator, and the negative electrode) of about 88 volume % to about 95 volume % based on the entire volume of the battery case, for example, a packing ratio of about 88 volume % to about 95 volume %. In the present specification, the entire volume of the battery case may be the entire volume of the battery case before battery assembly or the entire volume of the battery case when the volume of the battery case is increased due to initial charge and discharge and the like (e.g., may be increased up to about 105 volume % based on 100 volume % of the initial battery case volume).

When the packing ratio is within the foregoing range, a battery may suitably or appropriately have desired or suitable capacity. For example, a battery requiring of high intercalation and deintercalation characteristics may have suitable or optimal capacity by adjusting active mass density and thickness of the positive and negative electrodes to have the packing ratio and the relationship A/B.

The accompanying drawing is a schematic view showing the representative structure of a rechargeable lithium battery according to one embodiment. As shown in the accompanying drawing, the rechargeable lithium battery 1 includes a positive electrode 2, a negative electrode 4, and a separator 3 interposed between the positive electrode 2 and negative electrode 4, an electrolyte immersed therein, a battery case 5, and a sealing member 6 sealing the battery case 5.

The following examples illustrate embodiments of the present disclosure in more detail. These examples, however, are not in any sense to be interpreted as limiting the scope of the present disclosure.

Manufacture of Positive Electrode

EXAMPLE 1

85 wt % of $LiCoO_2$, 5 wt % of activated carbon, 4 wt % of denka black, and 6 wt % of polyvinylidene fluoride (Solef 6020, Solvay) were mixed in an N-methyl pyrrolidone solvent, preparing a positive active material slurry.

The positive active material slurry was coated on both sides of a 15 μm-thick Al foil, dried at 100° C., and pressed to form each active mass layer (positive active material layer) having an active mass density of 1 g/cc and a total thickness of 89 μm (i.e., a thickness sum of both of the active mass layers, where the sum of the thicknesses of the two active mass layers was 89 μm), thereby manufacturing a positive electrode. An entire thickness of the positive electrode was 104 μm. Accordingly, a ratio of the positive electrode active mass density (g/cc)/the positive electrode thickness (μm) was 0.01.

EXAMPLE 2

A positive electrode having an entire thickness of 81 μm was manufactured by coating a positive active material slurry prepared according to Example 1 on both sides of a 15 μm-thick Al foil, drying it at 100° C., and pressing it to form each active mass layer (positive active material layer) having an active mass density of 1.5 g/cc and a total thickness (i.e., a thickness sum of both of the active mass layers) of 66 μm (the sum of the thicknesses of the two active mass layers was 66 μm). Accordingly, a ratio of the positive electrode active mass density (g/cc)/the positive electrode thickness (μm) was 0.019.

EXAMPLE 3

A positive electrode having an entire thickness of 59 μm was manufactured by coating a positive active material slurry prepared according to Example 1 on both sides of a 15 μm-thick Al foil, drying it at 100° C., and pressing it to form each active mass layer (positive active material layer) having an active mass density of 2.0 g/cc and a total thickness (i.e., a thickness sum of both of the active mass layers) of 44 μm (the sum of the thicknesses of the two active mass layers was 44 μm). Accordingly, a ratio of the positive electrode active mass density (g/cc)/the positive electrode thickness (μm) was 0.034.

EXAMPLE 4

A positive electrode having an entire thickness of 45 μm was manufactured by coating a positive active material slurry prepared according to Example 1 on both sides of a 15 μm-thick Al foil, drying it at 100° C., and pressing it to form each active mass layer (positive active material layer) having an active mass density of 3.0 g/cc and a total thickness (i.e., a thickness sum of both of the active mass layers) of 30 μm (the sum of the thicknesses of the two active mass layers was 30 μm). Accordingly, a ratio of the positive electrode active mass density (g/cc)/the positive electrode thickness (μm) was 0.067.

EXAMPLE 5

A positive electrode having an entire thickness of 192 μm was manufactured by coating a positive active material slurry prepared according to Example 1 on both sides of a 15 μm-thick Al foil, drying it at 100° C., and pressing it to form each active mass layer (positive active material layer) having an active mass density of 4.0 g/cc and a total thickness (i.e., a thickness sum of both of the active mass layers) of 177 μm (the sum of the thicknesses of the two active mass layers was 177 µm). Accordingly, a ratio of the positive electrode active mass density (g/cc)/the positive electrode thickness (µm) was 0.100.

COMPARATIVE EXAMPLE 1

A positive electrode having an entire thickness of 192 µm was manufactured by coating a positive active material slurry prepared according to Example 1 on both sides of a 15 µm-thick Al foil, drying it at 100° C., and pressing it to form each active mass layer (positive active material layer) having an active mass density of 0.5 g/cc and a total thickness (i.e., a thickness sum of both of the active mass layers) of 177 µm (the sum of the thicknesses of the two active mass layers was 177 µm). Accordingly, a ratio of the positive electrode active mass density (g/cc)/the positive electrode thickness (µm) was 0.003.

COMPARATIVE EXAMPLE 2

A positive electrode having an entire thickness of 33 µm was manufactured by coating a positive active material slurry prepared according to Example 1 on both sides of a 15 µm-thick Al foil, drying it at 100° C., and pressing it to form each active mass layer (positive active material layer) having an active mass density of 0.5 g/cc and a total thickness (i.e., a thickness sum of both of the active mass layers) of 18 µm (the sum of the thicknesses of the two active mass layers was 18 µm). Accordingly, a ratio of the positive electrode active mass density (g/cc)/the positive electrode thickness (µm) was 0.152.

Manufacture of Negative Electrode

EXAMPLE 6

A negative active material slurry was prepared by mixing 92 wt % of soft carbon, 5 wt % of denka black, and 3 wt % of a mixture of styrene-butadiene rubber and carboxylmethyl cellulose (a weight ratio of 2:1 of styrene-butadiene rubber and carboxylmethyl cellulose) in water as a solvent.

The negative active material slurry was coated on both sides of a 10 µm-thick Cu foil, dried at 100° C., and pressed to form active mass layers (negative active material layers) having an active mass density of about 1 g/cc and a total thickness of 50 µm (i.e., a thickness sum of two active mass layers, where the sum of the thicknesses of the two active mass layers was 50 µm). The negative electrode had an entire thickness of 60 µm. Accordingly, a ratio of the negative electrode active mass density (g/cc)/the negative electrode thickness (µm) was 0.017.

EXAMPLE 7

A negative electrode having an entire thickness of 50 µm was manufactured by coating a negative active material slurry prepared according to Example 6 on both sides of a 10 µm-thick Cu foil, drying it at 100° C., and pressing it to form each active mass layer (negative active material layer) having an active mass density of 1.1 g/cc and a total thickness (i.e., a thickness sum of both of the active mass layers) of 40 µm (the sum of the thicknesses of the two active mass layers was 40 µm). Accordingly, a ratio of the negative electrode active mass density (g/cc)/the negative electrode thickness (µm) was 0.022.

EXAMPLE 8

A negative electrode having an entire thickness of 44 µm was manufactured by coating a negative active material slurry prepared according to Example 6 on both sides of a 10 µm-thick Cu foil, drying it at 100° C., and pressing it to form each active mass layer (negative active material layer) having an active mass density of 1.5 g/cc and a total thickness (i.e., a thickness sum of both of the active mass layers) of 34 µm (the sum of the thicknesses of the two active mass layers was 34 µm). Accordingly, the negative electrode active mass density (g/cc)/the negative electrode thickness (µm) had a ratio of the negative electrode active mass density (g/cc)/the negative electrode thickness (µm) was 0.034.

EXAMPLE 9

A negative electrode having an entire thickness of 42 µm was manufactured by coating a negative active material slurry prepared according to Example 6 on both sides of a 10 µm-thick Cu foil, drying it at 100° C., and pressing it to form each active mass layer (negative active material layer) having an active mass density of 1.6 g/cc and a total thickness (i.e., a thickness sum of both of the active mass layers) of 32 µm (the sum of the thicknesses of the two active mass layers was 32 µm). Accordingly, the negative electrode active mass density (g/cc)/the negative electrode thickness (µm) had a ratio of the negative electrode active mass density (g/cc)/the negative electrode thickness (µm) was 0.038.

EXAMPLE 10

A negative electrode having an entire thickness of 40 µm was manufactured by coating a negative active material slurry prepared according to Example 6 on both sides of a 10 µm-thick Cu foil, drying it at 100° C., and pressing it to form each active mass layer (negative active material layer) having an active mass density of 1.8 g/cc and a total thickness (i.e., a thickness sum of both of the active mass layers) of 30 µm (the sum of the thicknesses of the two active mass layers was 30 µm). Accordingly, the negative electrode active mass density (g/cc)/the negative electrode thickness (µm) had a ratio of the negative electrode active mass density (g/cc)/the negative electrode thickness (µm) was 0.045.

COMPARATIVE EXAMPLE 3

A negative electrode having an entire thickness of 80 µm was manufactured by coating a negative active material slurry prepared according to Example 6 on both sides of a 10 µm-thick Cu foil, drying it at 100° C., and pressing it to form each active mass layer (negative active material layer) having an active mass density of 0.7 g/cc and a total thickness (i.e., a thickness sum of both of the active mass layers) of 70 µm (the sum of the thicknesses of the two active mass layers was 70 µm). Accordingly, the negative electrode active mass density (g/cc)/the negative electrode thickness (µm) had a ratio of the negative electrode active mass density (g/cc)/the negative electrode thickness (µm) was 0.009.

COMPARATIVE EXAMPLE 4

A negative electrode having an entire thickness of 38 µm was manufactured by coating a negative active material slurry prepared according to Example 6 on both sides of a 10 µm-thick Cu foil, drying it at 100° C., and pressing it to form each active mass layer (negative active material layer)

having an active mass density of 2.0 g/cc and a total thickness (i.e., a thickness sum of both of the active mass layers) of 28 μm (the sum of the thicknesses of the two active mass layers was 28 μm). Accordingly, the negative electrode active mass density (g/cc)/the negative electrode thickness (μm) had a ratio of the negative electrode active mass density (g/cc)/the negative electrode thickness (μm) was 0.053.

Each positive electrode prepared according to Examples 1 to 5 and Comparative Example 1 to 2 was respectively combined with the negative electrode prepared according to Example 6 to manufacture a battery cell. Herein, an electrolyte solution was prepared by dissolving 1.15 M LiPF$_6$ in a mixed solution of ethylene carbonate, ethylmethyl carbonate, and dimethyl carbonate (a volume ratio of 2:4:4) and adding 0.5 wt % of tris(trimethylsilylborate) thereto.

The battery cell was once charged and discharged at 1 C, once charged and discharged at 50 C, and a ratio 50 C/1 C (%) of the 50 C discharge capacity relative to the 1 C discharge capacity was calculated and is provided in Table 1. In addition, the 50 C discharge capacity is also provided in Table 1. The active mass density, the thickness of the positive electrode, and the density/thickness ratio are also provided in Table 1.

TABLE 1

|  | Positive electrode active mass density (g/cc) | Positive electrode thickness (μm) | Positive electrode active mass density (g/cc)/positive electrode thickness (μm) (A) | 50 C/ 1 C (%) | 50 C Discharge Capacity (Ah) |
|---|---|---|---|---|---|
| Example 1 | 1 | 104 | 0.010 | 92 | 8.5 |
| Example 2 | 1.5 | 81 | 0.019 | 92 | 9.2 |
| Example 3 | 2 | 59 | 0.034 | 92 | 11 |
| Example 4 | 3 | 45 | 0.067 | 85 | 12 |
| Example 5 | 4 | 40 | 0.100 | 80 | 12.4 |
| Comparative Example 1 | 0.5 | 192 | 0.003 | 30 | 6.2 |
| Comparative Example 2 | 5 | 33 | 0.152 | 22 | 12.8 |

As shown in Table 1, Examples 1 to 5 having a ratio of positive electrode active mass density (g/cc)/positive electrode thickness (μm) (that is, a ratio A) in a range of 0.01 to 0.1 maintained appropriate or suitable capacity and showed excellent high rate capability.

On the contrary, Comparative Examples 1 and 2 having a ratio A of 0.003 and 0.153, respectively, which were either smaller than (Comparative Example 1) or larger than (Comparative Example 2) the range of 0.01 to 0.1, showed remarkably low high rate capability. For example, Comparative Example 1 even having a positive electrode active mass density in a range of 0.5 g/cc to 3.5 g/cc and a positive electrode thickness in a range of 30 μm to 200 μm, but a low ratio A of 0.003, showed remarkably deteriorated high rate capability and capacity.

Each negative electrode prepared according to Examples 6 to 10 and Comparative Examples 3 to 4 was respectively combined with the positive electrode prepared according to Example 3 to manufacture a battery cell. Herein, an electrolyte solution was prepared by dissolving 1.15 M LiPF$_6$ in a mixed solution of ethylene carbonate, ethylmethyl carbonate, and dimethyl carbonate (a volume ratio of 2:4:4) and adding 0.5 wt % of tris(trimethylsilylborate) thereto.

The battery was once charged and discharged at 1 C and then, once charged and discharged at 50 C, and a ratio of the 50 C discharge capacity relative to the 1 C discharge capacity as 50 C/1 C (%) is provided in Table 2. In addition, the 50 C discharge capacity is also provided in Table 2. The active mass density, the thickness of the negative electrode, and the active mass density/thickness ratio of the negative electrode are also provided in Table 2.

TABLE 2

|  | Negative electrode active mass density (g/cc) | Negative electrode thickness (μm) | Negative electrode active mass density (g/cc)/negative electrode thickness (μm) (B) | 50 C/ 1 C (%) | 50 C Discharge Capacity (Ah) |
|---|---|---|---|---|---|
| Example 6 | 1 | 60 | 0.017 | 92 | 8.9 |
| Example 7 | 1.2 | 50 | 0.024 | 92 | 10.5 |
| Example 8 | 1.5 | 44 | 0.034 | 91 | 12.1 |
| Example 9 | 1.63 | 42 | 0.038 | 87 | 12.8 |
| Example 10 | 1.8 | 40 | 0.045 | 85 | 13.4 |
| Comparative Example 3 | 0.7 | 80 | 0.009 | 25 | 7.2 |
| Comparative Example 4 | 2 | 38 | 0.053 | 24 | 14.3 |

As shown in Table 2, Examples 6 to 10 having a ratio of negative electrode active mass density (g/cc)/negative electrode thickness (μm) (that is, a ratio B) in a range of 0.01 to 0.05 maintained appropriate or suitable capacity and showed excellent high rate capability.

On the contrary, Comparative Examples 3 and 4 having a ratio B of 0.009 and 0.053, respectively, which were either smaller than (Comparative Example 3) or larger than (Comparative Example 4) the range 0.01 to 0.05, showed remarkably low high rate capability.

EXAMPLE 11

A jelly-roll was manufactured by inserting a separator between a positive electrode prepared according to Example 1 and a negative electrode prepared according to Example 6 and winding them into a cylindrical shape. The separator was a 25 μm-thick polyethylene/polypropylene/polyethylene three-layered film.

The jelly-roll was placed in a 18650 size battery case, and 50 g of an electrolyte solution was injected thereinto, thereby manufacturing a rechargeable lithium battery cell. The electrolyte solution was obtained by dissolving 1.15 M LiPF$_6$ in a mixed solution of ethylene carbonate, ethylmethyl carbonate, and dimethyl carbonate (a volume ratio of 2:4:4) and adding 0.5 wt % of tris(trimethylsilylborate) thereto. Herein, the jelly-roll (the positive electrode, the negative electrode, and the separator) had about 92 volume % of a volume based on 100 volume % of the battery case.

EXAMPLE 12

A rechargeable lithium battery cell was manufactured according to the same method as described with respect to Example 11 except for using a positive electrode prepared according to Example 2 and a negative electrode prepared according to Example 7.

EXAMPLE 13

A rechargeable lithium battery cell was manufactured according to the same method as described with respect to Example 11 except for using a positive electrode prepared according to Example 3 and a negative electrode prepared according to Example 8.

EXAMPLE 14

A rechargeable lithium battery cell was manufactured according to the same method as described with respect to Example 11 except for using a positive electrode prepared according to Example 4 and a negative electrode prepared according to Example 9.

EXAMPLE 15

A rechargeable lithium battery cell was manufactured according to the same method as described with respect to Example 11 except for using a positive electrode prepared according to Example 5 and a negative electrode prepared according to Example 10.

COMPARATIVE EXAMPLE 5

A rechargeable lithium battery cell was manufactured according to the same method as described with respect to Example 11 except for using a positive electrode prepared according to Comparative Example 1 and a negative electrode prepared according to Comparative Example 3.

COMPARATIVE EXAMPLE 6

A rechargeable lithium battery cell was manufactured according to the same method as described with respect to Example 11 except for using a positive electrode prepared according to Comparative Example 2 and a negative electrode prepared according to Comparative Example 4.

The battery cells were once charged and discharged at 1 C and once charged and discharged at 50 C. A ratio of the 50 C discharge capacity relative to the 1 C discharge capacity as 50 C/1 C (%) is provided in Table 3. In addition, the 50 C discharge capacity is also provided in Table 3. The ratio of the active mass density (g/cc) to the thickness (the entire thickness, μm) of the negative electrode (a ratio A), the ratio of the active mass density (g/cc) to the thickness (the entire thickness, μm) of the positive electrode (a ratio B), and a ratio of A to B are also provided in Table 3.

TABLE 3

| | Positive electrode active mass density (g/cc)/positive electrode thickness (μm) (A) | Negative electrode active mass density (g/cc)/negative electrode thickness (μm) (B) | A/B | 50 C/ 1 C (%) | 50C Discharge Capacity (Ah) |
|---|---|---|---|---|---|
| Example 11 | 0.005 | 0.0165 | 0.3 | 82 | 7.2 |
| Example 12 | 0.010 | 0.017 | 0.588 | 92 | 8.9 |
| Example 13 | 0.019 | 0.024 | 0.792 | 92 | 11.2 |
| Example 14 | 0.034 | 0.034 | 1.000 | 91 | 12.9 |
| Example 15 | 0.067 | 0.038 | 1.763 | 88 | 14.7 |
| Example 16 | 0.100 | 0.045 | 2.222 | 85 | 16.1 |
| Example 17 | 0.13 | 0.052 | 2.5 | 81 | 16.8 |
| Comparative Example 5 | 0.004 | 0.0135 | 0.296 | 35 | 6.2 |
| Comparative Example 6 | 0.003 | 0.011 | 0.273 | 25 | 5.8 |
| Comparative Example 7 | 0.135 | 0.0525 | 2.571 | 32 | 17.1 |

TABLE 3-continued

| | Positive electrode active mass density (g/cc)/positive electrode thickness (μm) (A) | Negative electrode active mass density (g/cc)/negative electrode thickness (μm) (B) | A/B | 50 C/ 1 C (%) | 50C Discharge Capacity (Ah) |
|---|---|---|---|---|---|
| Comparative Example 8 | 0.153 | 0.053 | 2.887 | 24 | 17.5 |

As shown in Table 3, Examples 11 to 17 having a ratio A/B in a range of 0.3 to 2.5 maintained appropriate or suitable capacity and showed very excellent high rate capability.

On the contrary, Comparative Examples 5, 6, 7, and 8, having a ratio A/B of 0.296, 0.273, 2.571, and 2.887, respectively, which were either smaller than (Comparative Examples 5 and 6) or larger than (Comparative Examples 7 and 8) the range of 0.3 to 2.5, showed remarkably low high rate capability.

It will be understood that when an element or layer is referred to herein as being "on" another element or layer, it can be directly on the other element or layer, or one or more intervening elements or layers may be present. For example, the positive active mass layer may be directly or indirectly on the positive current collector. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

While this disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims, and equivalents thereof.

What is claimed is:

1. A rechargeable lithium battery, comprising:
a positive electrode comprising a positive current collector and a positive active mass layer on the positive current collector, the positive active mass layer comprising a positive active material;
a negative electrode comprising a negative current collector and a negative active mass layer on the negative current collector, the negative active mass layer comprising a negative active material; and
an electrolyte,
wherein Equation 1 is satisfied:

$$0.3 \leq A/B \leq 1.000 \qquad \text{Equation 1}$$

wherein, in Equation 1,
A satisfies Equation 2, and
B satisfies Equation 3:

$$0.01 \leq \text{active mass density (g/cc) of the positive active mass layer/thickness (μm) of the positive electrode} \leq 0.1, \qquad \text{Equation 2}$$

$$0.01 \leq \text{active mass density (g/cc) of the negative active mass layer/thickness (μm) of the negative electrode} \leq 0.05, \text{ and} \qquad \text{Equation 3}$$

wherein the active mass density of the positive active mass layer is 3.0 g/cc to 4.0 g/cc and wherein the electrolyte includes an organic solvent and a lithium salt, and the organic solvent includes a carbonate-based solvent, an ester-based solvent, an ether-based solvent, or a combination thereof, and
wherein the thickness of the negative electrode is 30 μm to 50 μm.

2. The rechargeable lithium battery of claim 1, wherein the positive active mass layer is on both sides of the positive current collector.

3. The rechargeable lithium battery of claim 1, wherein the negative active mass layer is on both sides of the negative current collector.

4. The rechargeable lithium battery of claim 1, wherein the thickness of the positive electrode is about 30 μm to about 200 μm.

5. The rechargeable lithium battery of claim 1, wherein the active mass density of the negative active mass layer is about 0.5 g/cc to about 2.5 g/cc.

6. The rechargeable lithium battery of claim 1, wherein the positive active mass layer further comprises activated carbon.

7. The rechargeable lithium battery of claim 1, wherein the negative active material comprises soft carbon.

8. The rechareable lithium battery of claim 1, wherein the carbonate-based solvent comprises dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butyleen carbonate (BC), or a combination thereof; the ester-based solvent comprises methyl acetate, ethyl acetate, n-propyl acetate, dimethylacetate, methylpropionate, ethylpropionate, γ-butyrolactone, decanolide, valerolactone, mevalonolactone, caprolactone, or a combination thereof; the ether-based solvent comprises dibutyl ether, tetraglyme, diglyme, dimethoxyethane, 2-methyltetrahydrofuran, tetrahydrofuran, or a combination thereof.

* * * * *